US005670560A

United States Patent [19]

Lower et al.

[11] Patent Number: 5,670,560
[45] Date of Patent: Sep. 23, 1997

[54] METHOD OF MAKING A PUMPABLE, STABLE POLYDIORGANOSILOXANE-SILICA FOUNDATION MIXTURE AND ROOM TEMPERATURE CURING SEALANT

[75] Inventors: Loren Dale Lower; Sherwood Spells, both of Midland, Mich.

[73] Assignee: Dow Corning Corporation, Midland, Mich.

[21] Appl. No.: 564,840

[22] Filed: Nov. 29, 1995

[51] Int. Cl.$^6$ .............................. C08K 9/06; C08L 83/00
[52] U.S. Cl. ........................ 523/212; 524/860; 524/847; 524/731; 524/588; 524/457; 524/837; 427/213
[58] Field of Search ...................... 524/860, 847, 524/731, 588, 457, 837; 523/212; 427/213

[56] References Cited

U.S. PATENT DOCUMENTS 2,890,188  6/1959  Konkle et al. ..................... 260/29.1

*Primary Examiner*—Karen A. Dean
*Attorney, Agent, or Firm*—Roger H. Borrousch

[57] ABSTRACT

A process of making a pumpable, stable, polydiorganosiloxane-silica foundation mixture by mixing and heating a polydiorganosiloxane, a reinforcing silica filler, and a diol surface modifying agent at >50° C. to <180° C. using 0.05 to 0.5 parts by weight of the diol per one part by weight of the silica. The foundation mixture can be used to make RTV silicone sealant compositions which are non-sag.

21 Claims, No Drawings

1

METHOD OF MAKING A PUMPABLE, STABLE POLYDIORGANOSILOXANE-SILICA FOUNDATION MIXTURE AND ROOM TEMPERATURE CURING SEALANT

BACKGROUND OF THE INVENTION

1. Field of the Invention

This invention relates to a process of preparing a non-slump silica filled, room temperature vulcanizable (RTV) silicone sealant.

2. Background Information

RTV silicone sealants are used for a variety of adhesive and weatherproofing applications. Many of these applications require a material to have the consistency that allows it to be installed in the uncured state in a vertical configuration while maintaining its shape until cure has occurred. A sealant which maintains its shape in a vertical configuration until cure has occurred is said to have non-slump or non-sag properties. If a sealant sags or flows from its initial configuration, the desired weatherproofing or adhesive property will not be obtained. A typical silicone sealant formulation comprises a silicone polymer, a curing agent, such as a crosslinker or a combination of a crosslinker and a curing catalyst, and a filler, such as a reinforcing silica filler and an extending filler. The reinforcing silica, such as fumed silica filler, is used to provide reinforcement to the polymeric network, to provide a thixotropic property to the uncured composition, and to provide higher tensile strength and tear strength to the cured product. It is generally known that the silica must be treated in order to produce a non-sag sealant composition. Without treatment, a slumpy or saggy sealant composition can result.

One way to prepare non-sag silicone sealants is to first react a crosslinker with a silicon-bonded hydroxyl endblocking group of a polydiorganosiloxane and then follow with the addition of silica filler. Using this approach, crosslinker is used in an AMOYUNT sufficient to react with the hydroxyl groups of the polydiorganosiloxane and the hydroxyl groups on the silica. This process provides the desired non-sag sealant composition, but this means the process is limited to one type of cure chemistry, such as to a sealant composition with organotriacetoxysilane crosslinker or a sealant composition with organotrioximosilane crosslinker, during the manufacturing operations. However, if a foundation mixture could be prepared without the curing agent, i.e. crosslinker and curing catalyst, and if this foundation mixture could be used as the basis for the preparation of a variety of sealant compositions having different curing agent chemistries, the advantages are many. For example, one type of starting mixture means .that only minor changes on continuous mixing equipment are required, such that change over from one sealant composition or another type can be readily done. The number of ingredients in inventory can be reduced and equipment can become available for other manufacturing processes. Also, the flexibility of the kinds of products made from one starting material is an advantage for meeting customer needs in a hurry.

SUMMARY OF THE INVENTION

In order to make a foundation mixture viable for the manufacture of sealant compositions, it needs to be stable over the time period from immediately after its preparation to the time when the foundation mixture is formulated into an RTV silicone sealant composition. By being stable for the purposes of this invention, it means that the foundation mixture can be used to formulate a sealant composition and the resulting sealant composition will have a maximum slump of 0.51 cm (0.20 inch) as defined by ASTM D 2202, preferably less. A foundation mixture is pumpable if it can be pumped through piping by conventional pumps used in sealant manufacture.

It is desirable to prepare a non-sag, one-package, RTV, silicone sealant composition from a foundation mixture which avoids during storage the well-known silica-polymer interaction problems, known as crepe hardening or structure formation. Generally, it is believed that the use of pretreated reinforcing silica fillers eliminates these silica-polymer interactions and provides a stable composition comprising polydiorganosiloxane and reinforcing silica filler. However, the present inventors have found that a stable foundation mixture of silica filler and polydiorganosiloxane wherein the siloxane polymer has a viscosity at 25° C. of 400 Pa.s or less, is not obtained with ordinary pretreated reinforcing silica fillers. In fact, commercially available pretreated silica fillers, such as TS-610 (R) and TS-530(R) available from Cabot Corporation, Tuscola, Ill., required additional treatment to produce a foundation mixture with long term stability such that an acceptable sealant composition could be produced. TS-610 is a dimethyldichlorosilane treated fumed silica with a surface area of about 120 +/−20 $m^2/g$ and TS-530 is a hexamethyldisilazane treated fumed silica with a surface area of about 200 +/−40 $m^2/g$.

This invention relates to a process for making a pumpable, stable, polydiorganosiloxane-silica foundation mixture comprising (i) mixing a polydiorganosiloxane having a viscosity measured at 25° C. of from 0.1 to 400 Pa.s, a diol surface modifying agent of the formula $R'O(R_2SiO)_xR'$ wherein R is methyl, ethyl, vinyl, or 3,3,3-trifluoropropyl, each R' is selected from the group consisting of hydrogen atom, methyl radical, and ethyl radical, up to 30 percent of R' groups are methyl radical or ethyl radical, and x is a value of from 2 to 18 inclusive and the diol surface modifying agent has at least 3 weight percent silicon-bonded hydroxyl group, and reinforcing silica filler having a surface area of 90 to 500 $m^2/g$ and making a Mixture 1 where the amount of the polydiorganosiloxane is from 50 to 100 weight percent of the amount necessary to provide from 80 to 95 weight percent in the foundation mixture, diol in an amount to provide from 20 to 100 weight percent of the amount necessary to provide from 0.05 to 0.5 part of diol per one part of silica filler in the foundation mixture, and silica filler in an amount to provide from 0 to 100 weight percent of the amount necessary to provide from 5 to 19.5 weight percent of silica filler in the foundation mixture based on the weight of the polydiorganosiloxane, the silica filler, and the diol being 100 weight percent, where the silica filler is dispersed throughout the polydiorganosiloxane (ii) mixing with Mixture 1, one or more increments, where an increment is at least 5 weight percent of the amount to be added, of diol and silica filler to make Mixture 2, where the amount of the diol is from 0 to 80 weight percent of the amount necessary to provide from 0.05 to 0.5 part of diol per one part of silica filler in the foundation mixture and the amount of the silica filler is up to 100 weight percent of the amount necessary to provide from 5 to 19.5 weight percent silica filler in the foundation mixture based on the polydiorganosiloxane, the silica filler, and the diol being 100 weight percent, (iii) mixing with Mixture 2, one or more increments, where an increment is at least 5 weight percent of the amount to be added, of polydiorganosiloxane as defined in (i) to make Mixture 3 and in an amount of 0 to 50 weight percent of the amount necessary to provide from 80 to 95 weight percent of the polydiorganosiloxane in the foundation mixture, (iv) mixing and heating Mixture 3 for at least 15 minutes at a temperature of from 50° C. to 180° C. while removing volatiles from Mixture 3, and obtaining a foundation mixture having from 5 to 19.5 weight percent silica filler and from 80 to 95 weight percent polydiorganosiloxane based on the weight of the polydiorganosiloxane, the silica filler, and the diol being 100 weight percent where the foundation mixture has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

DETAILED DESCRIPTION OF THE PREFERRED EMBODIMENTS

The process of this invention is to prepare a foundation mixture of polydiorganosiloxane and reinforcing silica which can be used to make one-package, RTV, silicone sealant compositions which are non-sag. In the process of combining reinforcing silica filler with silanol terminated polydiorganosiloxane, non-sag silicone sealants can be made from the foundation mixture, if the reinforcing silica filler is combined with the polydiorganosiloxane and the short chain polydiorganosiloxane having silicon-bonded hydroxyl groups, with mixing, heating, and removal of volatiles.

One approach to obtaining the foundation mixtures of this invention is to mix part of the silica filler, diol, and polydiorganosiloxane incrementally where a portion of the silica filler and a portion of the diol are mixed with from 40 to 70 weight percent of the polydiorganosiloxane, followed by incremental additions of diol and silica filler until the desired amount of silica filler and diol are present. The resulting mixture is then heated at a temperature of from 50° C. to 180° C. in an inert atmosphere, such as under a nitrogen blanket, for at least 15 minutes, for example from 15 to 30 minutes. The volatiles which may be generated during the processing are removed during additional mixing. After the resulting mixture is devolatilized, polydiorganosiloxane is added incrementally until the amount of polydiorganosiloxane reaches the desired amount for the foundation mixture. More specifically the weight percentages, in the following illustrations, are those based on the total amount in the foundation mixture produced by the method.

Method 1: Step (1), a Mixture-A is produced by mixing 40 to.70 weight percent of the polydiorganosiloxane, 20 to 40 weight percent of diol, and 20 to 40 weight percent of silica filler for at least 5 minutes. Step (2), 20 to 40 weight percent of diol, and 20 to 40 weight percent of silica filler are added and mixed with Mixture-A for at least 5 minutes to produce Mixture-B. Step (3), the remainder of the diol and silica filler are added to Mixture-B and mixed for at least 5 minutes to produce Mixture-C, where the amount of diol is from 20 to 40 weight percent and the amount of silica filler is from 20 to 40 weight percent. Step (4), after the completion of the addition of the diol and silica filler in Step (3), Mixture-C is mixed at an increased shear over the mixing shear in the earlier steps, under a nitrogen blanket while heating at a temperature of from 50° C. to 180° C., preferably from 100° C. to 150° C, for at least 15 minutes, preferably from 15 to 60 minutes. During the heating period, volatiles are removed from the mixture over a high shear mixing period of at least 15 minutes to produce Mixture-D. Step (5), add 5 weight percent of the remaining 35 weight percent polydiorganosiloxane to Mixture-D and mix for at least 5 minutes to produce Mixture-E. Step (6), add 10 weight percent of the remaining 35 weight percent of polydiorganosiloxane to Mixture-E and mix for at least 5 minutes to produce Mixture-F. Step (7), add 20 weight percent of the remaining 35 weight percent of polydiorganosiloxane to Mixture-F and mix for at least 5 minutes to produce Mixture-G. Step (8), add the remaining 65 weight percent of the remaining 35 weight percent of the polydiorganosiloxane to Mixture-G and mix for at least 15 minutes while heating at 50° C. to 180° C., preferably from 100° C. to 150° C. to obtain the foundation mixture.

Method 2: The diol and polymer in amounts desired in the foundation mixture are mixed for at least 5 minutes to produce Mixture-A', and then one half of the silica filler is added to Mixture-A' and mixed to produce Mixture-B'. The remaining one half of the silica filler is added to Mixture-B' and mixed for at least 5 minutes to produce Mixture-C' which is then heated at 50° C. to 180° C. for at least 15 minutes to produce the foundation mixture. The volatiles are removed during the heating step. Instead of adding one half of the silica filler to the mixture of diol and polydiorganosiloxane, smaller increments can be used with additional mixing steps for each incremental addition. Sometimes the particular kind of silica filler-polydiorganosiloxane combination may be easier to process if smaller increments of silica filler are added to the polydiorganosiloxane-diol mixture.

Method 3: The polydiorganosiloxane desired in the foundation mixture are mixed with one half of the silica filler desired in the foundation mixture and one half of the diol desired in the foundation mixture for at least 5 minutes, then the remaining one half of the silica filler and one half of the diol are added to the resulting mixture and mixed for at least 15 minutes while heating at 50° C. to 180° C., preferably from 100° C. to 150° C., during which volatiles are removed. As stated for Method 2, smaller increments can be used for the diol and the silica filler with an increase in the number of mixing steps.

Method 4: The foundation mixture can be made continuously by loading a portion of the polydiorganosiloxane, for example from 30 to 70 weight percent of that amount which is desired for the foundation mixture, adding the diol and silica filler further down the mixer, and then adding the remaining amount of polydiorganosiloxane still further down the mixer where the volatiles are removed. Using the continuous mixing method one can feed crosslinker, catalyst, and additives for the formation of a room temperature vulcanizable silicone sealant composition directly to the foundation mixture stream. Other variation for the order of addition of the ingredients may be used, such as the polydiorganosiloxane and diol can be mixed prior to entering the mixer and the silica filler added further down steam.

The short chain polydiorganosiloxane having silicon-bonded hydroxyl groups for the purposes of this invention is defined as a diol surface modifying agent (referred to herein as diol) of the formula R'O(R$_2$SiO)$_x$R' wherein R is methyl, ethyl, vinyl, or 3,3,3-trifluoropropyl, each R' is hydrogen atom, methyl radical, or ethyl radical, and x is a value of from 2 to 18 inclusive. The diol has at least 3 weight percent silicon-bonded hydroxyl group. The preferred diols are those which are mixtures of molecules where at least 50 percent of the molecules have values for x of no more than 6 and the hydroxyl content of the mixture is at least 6 weight percent. Diols which have values of x of less than 6 provide foundation mixtures with longer stable storage times than those diols having a value of x greater than 6. Particularly useful diols are those which are mixtures of molecules where x has a value of about 4, and the R and R' groups are methyl and R' is from 10 to 20 percent methyl.

The reinforcing silica fillers are those which have a surface area of 90 to 500 m²/g. Many of this kind of silica filler are available commercially today and are well known, such as fumed silica. The silica fillers can be either untreated or treated. Treated silica fillers are well known in the art and as stated previously many are available commercially, such as TS-610 and TS-530. The silica filler treatments include triorganosiloxy surface treatment from reaction with triorganochlorosilane, hexaorganodisiloxane, hexaorganodisilazane; other silane treatments such as dimethyldichlorosilane,; and from various polydiorganosiloxanes which are endblocked with silicon-bonded hydroxyl groups or silicon-bonded alkoxy groups.

The mixture of the diol and the polydiorganosiloxane and the silica filler are combined to provide from 0.05 to 0.5 part by weight of diol per one part by weight of silica filler. The amount of diol provides the most stable foundation mixtures, i.e. have the longest storage times and still produce a non-sag, one-package, RTV, silicone sealant composition, when more than 0.25 part by weight of diol per one part of silica filler, is used. The storage stability of the foundation mixture and its ability to be formulated into non-sag sealant compositions is related to the chain length of the diol and its hydroxyl content. In both the foundation mixture and the sealant composition where everything is substantially equal except for the diol, the higher the diol chain length, such as x being 18, and the lower the hydroxyl content of the diol, such as about 3 weight percent, the more diol is required to obtain equivalent storage stability for the foundation mixture and equivalent sealant composition slump, compared to that which is obtainable from using diols with shorter chain lengths and higher hydroxyl content. Conversely, the shorter the diol chain length, such as x being 2 to 4, and the higher the hydroxyl content of the diol, the lower the concentration of diol required to obtain equivalent storage stability for the foundation mixture and equivalent sealant composition slump. Preferably, the diol is present in an amount such that there is from 0.015 to 0.025 part by weight of silicon-bonded hydroxyl group per one part by weight of silica filler.

The polydiorganosiloxane can be selected from those having silicon-bonded hydroxyl groups at both ends or a mixture of polydiorganosiloxanes wherein more than 50 percent of the polymer molecules have silicon-bonded hydroxyl groups at both ends and the remaining polymer molecules contain silicon-bonded hydroxyl groups on one end and triorganosiloxy units as the endblocker on the other end. Those polydiorganosiloxanes which are mixtures of polydiorganosiloxanes with silicon-bonded hydroxyl groups on both ends and polydiorganosiloxanes with silicon-bonded hydroxyl groups on one end and triorganosiloxy units at the other end are known in the art as shown by Dupree in U.S. Pat. No. 3,274,145, issued Sep. 20, 1966, which is hereby incorporated by reference to show polydiorganosiloxane mixtures having both silicon-bonded hydroxyl groups and triorganosiloxy groups. For this invention, when polymers having both silicon-bonded hydroxyl groups and triorganosiloxy groups are used, they preferably have at least 80 percent of the ends terminated with silicon-bonded hydroxyl groups. The polydiorganosiloxanes preferably have a viscosity at 25° C. of from 5 to 100 Pa.s. The polydiorganosiloxanes comprise diorganosiloxane units of the formula $R'_2SiO$ where R' is a monovalent hydrocarbon radical or a halogenated monovalent hydrocarbon radical which are illustrated by alkyl radicals including methyl, ethyl, propyl, isopropyl, butyl, pentyl, hexyl, and the like; alkenyl radicals, such as vinyl, allyl, hexenyl, and the like; cycloalkyl, such as cyclopentyl and cyclohexyl; aryl such as phenyl and tolyl; and haloalkyl such as chloropropyl, trifluoropropyl, (2-perfluoropropyl)ethyl, and the like. The preferred polydiorganosiloxanes are those which have mostly methyl with minor amounts of vinyl and phenyl radicals. Although these polymers are defined as polydiorganosiloxanes, small amounts of other units such as monoorganosilsesquioxane units, or $SiO_2$ units may be present as frequently found in the polydiorganosiloxane as a result of the manufacturing methods used. By small amounts, it is meant that there are less than about 5 mole percent of such units, preferably less than 2 mole percent. Other kinds of polydiorganosiloxanes can be used such as those which are endblocked with hydrolyzable containing silicon units, such as trimethoxysiloxy, methyldimethoxysiloxy, methyldiketoximosiloxy, triacetoxysiloxy, methyldiacetoxysiloxy, and those which contain divalent hydrocarbon linkages at the terminal portion of the polydiorganosiloxane, such as those which are disclosed by Klosowski et al in U.S. Pat. No. 4,871,827, issued Oct. 3, 1989, which is hereby incorporated by reference to show such polymers and their methods of preparation.

The heating and mixing can be accomplished by any mixing equipment which provides the necessary agitation, have the ability to heat as required, and removal of the volatiles such as a change can planetary mixer, like the Turello mixer, made by Turello Inc. of Italy. Such mixing equipment provides the required mixing along with the ability to heat and remove volatiles. The foundation mixture prepared by the method are storage stable and can be used to prepare one-package RTV silicone sealant composition which has non-sag properties. By storage stable it is meant that the products maintain their properties throughout the time period beginning at the time when they are made to the time when they are finally used to make an RTV silicone sealant composition and to the time when the RTV is cured. It is desirable to retain the uncured properties, such as rheology and non-sag properties of the RTV silicone sealant composition, as well as, the properties of the cured sealant, such as tensile strength, elongation, modulus, and tear strength.

In the process for making the foundation mixture, the reinforcing silica filler can be heated prior to mixing with other ingredients to a temperature in the range of from >100° C. to <180° C. to remove volatiles from the silica filler, such as water which is often associated with silica fillers, prior to its use in the method of this invention. The volatiles can be removed by a partial vacuum, by a nitrogen gas sweep, or by a combination of these two.

The amount of polydiorganosiloxane in a uniform foundation mixture prepared by the method of this invention is such that there is present from 5 to 19.5 weight percent silica filler based on the total weight of the foundation mixture, preferably the foundation mixture contains from 5 to 15 weight percent silica filler. As the concentration of silica filler in the foundation mixture increases above 15 weight percent, the processing becomes more difficult as the viscosity increases and it requires greater energy to produce sealant compositions as well as making uniform foundation mixture initially.

The foundation mixtures produced by the method of this invention have a "plateau stress" value of >700 dynes/cm², preferably >1,000 dynes/cm². This plateau stress value is a measure of polymer/filler interaction. After initial preparation plus any storage aging, a foundation mixture is considered stable when the plateau stress value is >700 dynes/cm², where this would be the point at which a crosslinker and a catalyst, if used, would be added to the foundation mixture. Sealant compositions made from foundation mixtures which have a plateau stress >1,000 dynes/cm², produce a composition with <0.5 cm (<0.2 inch) flow when measured by ASTM D 2202. The preferred foundation mixtures also have a shear-thinned viscosity of no more than 1,000 Pa.s at a shear stress of 50,000 dynes/cm², and preferably no more than 600 Pa.s where the viscosity is measured at 25° C. Therefore, the preferred foundation mixtures are those having a plateau stress of >700 dynes/cm² and a shear-thinned viscosity of no more than 1,000 Pa.s. Even more preferred foundation mixtures are those having a plateau stress of >1,000 dynes/cm² and a shear-thinned viscosity of no more than 600 Pa.s.

Plateau stress values were determined, for the purposes of this application, on a Carri-Med Rheometer (Model CSL 500) using cone and plate. The flow method was used to determine plateau stress values. The cone was a 0.5 degree, 2 cm diameter cone and the gap between the cone and the plate during testing was 13 microns (the test specimen thickness). Foundation mixture was gently removed from the storage container. A few grams were placed on the temperature controlled bottom plate (at 25° C.) before the plate was raised into position with the top cone to provide a specimen thickness of 13 microns. The test specimen was allowed to equilibrate for 1 to 5 minutes to reach the 25° C. condition. An initial stress of 100 dynes/cm² was applied to the test specimen. After equilibration, the shear stress was increased until the shear stress reached 50,000 dynes/cm² over a 5 minute period in a logarithmic stress sweep mode. This was called the up curve. Once 50,000 dynes/cm² was reached, this stress was held for 30 seconds. The shear stress was reduced to 100 dynes/cm² over a 5 minute period. This was called the down curve. The plateau stress value in dynes/cm² was the shear stress at the shear rate of 0.023 sec$^{-1}$ on the down curve. The shear-thinned viscosity was that viscosity mirrored when the shear stress was at 50,000 dynes/cm².

The resulting foundation mixtures are non-sag and can be used to make other silicone compositions which are non-sag, especially one-package, RTV, silicone sealant compositions. Such silicone sealant compositions can be prepared by adding a moisture hydrolyzable crosslinking silicone compound as a curing agent comprising a crosslinker or a crosslinker and a curing catalyst. The particular crosslinker can have an effect on the non-sag property of the final RTV silicone sealant composition. Curing catalysts are used, as required, to provide the utility of cure for the one-package, RTV, silicone sealant compositions made using the foundation mixture.

The crosslinker is a silicon compound containing silicon-bonded hydrolyzable groups, preferably silanes. The silicon-bonded hydrolyzable group is exemplified by acyloxy groups such as acetoxy, octanoyloxy, and benzoyloxy; ketoximo groups such as the dimethyl ketoximo group, the methylethyl ketoximo group, methyl amyl ketoximo group, methyl isobutyl ketoximo group, and the diethyl ketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group. The crosslinkers can have three or more silicon-bonded hydrolyzable groups per molecule. When the crosslinker is a silane and when the silane has three silicon-bonded hydrolyzable groups per molecule, the fourth groups is a non-hydrolyzable silicon-bonded organic group. The silicon-bonded organic groups are exemplified by alkyl groups such as methyl, ethyl, propyl, and butyl; cycloalkyl groups such as cyclopentyl and cyclohexyl; alkenyl groups such as vinyl and allyl; aryl groups such as phenyl, and tolyl; aralkyl groups such as 2-phenylethyl; and groups obtained by replacing all or part of the hydrogen in the preceding organic groups with halogen. The preferred silicon-bonded organic groups are preferably methyl.

The crosslinker can be a silane or siloxane, and in the case of siloxanes the molecular structure can be straight chain, branched, or cyclic. The silicon-bonded hydrolyzable groups are exemplified by acyloxy groups such as acetoxy, octanoyloxy, and benzoyloxy; ketoximo groups such as the dimethyl ketoximo group, the methyl ethyl ketoximo group, methyl amyl ketoximo group, methyl isobutyl ketoximo group, and the diethyl ketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group.

The silanes and siloxanes are exemplified by methyl trimethoxy silane, methyl triethoxy silane, vinyl trimethoxy silane, methyl phenyl dimethoxy silane, 3,3,3-trifluoropropyl trimethoxy silane, methyl triacetoxy silane, ethyl triacetoxy silane, vinyl triacetoxy silane, phenyl tripropionoxy silane, ethyl tris(N,N-diethylamino) silane, vinyl tris(N-methyl-N-cyclohexylamino) silane, dimethyl bis(N,N-dibutyl-amino) silane, methyl tris(N-methylacetamido) silane, methyl vinyl bis(N-ethylacetamido) silane, vinyl tris(N-ethylacetamido) silane, methyl tris(N,N-diethylaminoxy) silane, phenyl tris(N,N-diethylaminoxy) silane, methyl tris(methylethylketoximo) silane, vinyl tris (methylethylketoximo) silane, 3,3,3-trifluoropropyl tris (methylethylketoximo) silane, methyl tris(isopropenoxy) silane, vinyl tris(isopropenoxy) silane, ethylpolysilicate, n-propylortho-silicate, dimethyl tetraacetoxy disiloxane, pentamethyl tris(N,N-diethylaminoxy) cyclotetrasiloxane, hexamethyl bis(N,N-diethyl-aminoxy) cyclotetrasiloxane and mixtures thereof.

Some of the crosslinkers can be triketoximosilanes and tetraketoximosilane, triacetoxysilanes and other triacyloxysilanes, trialkoxysilanes and tetraalkoxysilanes, silanes which contain mixtures of ketoximo and alkoxy groups wherein various silanes having from 0 to 4 ketoximo groups per molecule and from 0 to 4 alkoxy groups per molecule wherein the total combined number of alkoxy and ketoximo groups per molecule are three or four. Silanes having both silicon-bonded ketoximo groups and alkoxy groups in the same molecule are known from Klosowski et al in U.S. Pat. No. 4,657,967, issued Apr. 14, 1987, and from Haugsby et al in U.S. Pat. No. 4,973,623, issued Nov. 27, 1990. Both Klosowski et al and Haugsby et al are hereby incorporated by reference to show the silanes and mixtures of silanes which have both ketoximo groups and alkoxy groups on the same molecule. A tribenzamidosilane crosslinker is an example of another crosslinker which can be used in making one-package, RTV, silicone sealant compositions of this invention. These are illustrations of crosslinker silanes which can be used to make RTV silicone sealant compositions which are non-sag.

The curing catalysts for a particular RTV silicone sealant composition depends upon the speed of cure required. Most of the RTV silicone sealant compositions which contain oximosilanes or acetoxysilanes use a tin catalyst for curing, especially diorganotin dicarboxylate compounds such as dibutyltin dilaurate, dibutyltin diacetate, dimethyltin bis-neodecanoate, and the like whereas for the alkoxysilane crosslinker containing RTV silicone sealant compositions the most preferred curing catalyst is a titanium catalyst such as tetrabutyltitantate, tetraisopropyltitanate, diisopropyl bis-(acetylacetonyl) titanate, diisopropyl bis-(ethylacetoacetonyl) titanate, and the like. Such crosslinkers and curing catalysts are well known to silicone sealant artisans and are well known in the silicone sealant art. A typical one-package, RTV, silicone sealant is therefore made according to the present invention from the foundation mixture, crosslinker, curing catalyst, and may contain other kinds of ingredients which are known to be used in silicone sealants, such as extending fillers, pigments, fungicides, antioxidants, UV absorbers, and other additives.

The RTV silicone sealant compositions of this invention can be made from a foundation mixture which has been stored for a period of time and a non-sag one-package RTV silicone sealant composition can still be obtained. Even longer storage times are obtainable if the foundation mixture is kept cool, i.e. below 15° C. If, however, a conventional treated silica filler, such as in concentrations used in this invention, were used to make a foundation mixture, a one-package, RTV, silicone sealant composition prepared from such a foundation mixture would not result in a non-sag product. Commercially available pretreated silicas, such as TS-610 and TS-530, can be used to make non-sag silicone sealant compositions, if diol is also used and the processes defined by this invention are used. In addition to obtaining non-sag one-package RTV silicone sealant compositions from the foundation mixture, the resulting sealant compositions have better clarity and better adhesion to plastics. An advantage of making non-sag silicone sealant composition from the foundation mixture of this invention is the ability to change from one cure chemistry, such as condensation reaction of silicon-bonded acetoxy functionality, to another cure chemistry, such as condensation reaction of silicon-bonded ketoximo functionality. Changing cure chemistries often in the past created large amounts of waste and long non-productive time periods, however, with the processes of this invention the change over from one cure chemistry to another is fast and amount of waste is small. The flexibility of being able to change quickly without loss of material and time is a great advantage. This is a substantial reduction in time over conventional manufacturing time for silicone sealants wherein the silica modification is included in the process time calculations.

The following examples are presented for illustrative purposes and should not be construed as limiting the invention which is delineated in the claims. In the following examples, "part" or "parts" are by weight, viscosities are as measured at 25° C. unless otherwise stated, Me is methyl radical.

EXAMPLE 1

Foundation mixtures were prepared by mixing at about 150 rpm for 5 minutes in a change can planetary mixer, 65 parts (65 weight percent of total in the foundation mixture) of polydimethylsiloxane (Polymer A) having a viscosity of about 12.5 Pa.s and having 85 % of the endgroups being hydroxyl and 15 % of the endgroups being trimethylsiloxy units (prepared as described by Dupree), 4.5 parts (⅓ of the total in the foundation mixture) of a silica filler, TS-610 (R) available from Cabot Corporation, Tuscola, Ill., a dimethyldichlorosilane treated fumed silica with a surface area of about 120 +/−20 m²/g, and ⅓ by weight of the amount as shown in Table I of a diol surface modifying agent where Diol-1 was a hydroxyl endblocked polydimethylsiloxane fluid having an average of about 11 dimethylsiloxane units per molecule and about 4 weight percent hydroxyl group and Diol-2 was a surface modifying agent of the formula R'O$(Me_2SiO)_xR'$ where x has an average value of 4 and about 20 percent of the R' are methyl radical. To the resulting mixture, 4.5 parts of the silica filler and ⅓ by weight of diol as identified in Table I was added and mixed for 5 minutes, then the remaining 4.5 parts of silica filler and ⅓ by weight of the diol were added and mixed for 5 minutes. A nitrogen blanket was placed over the resulting mixture using a nitrogen purge which was mixed for about 18 minutes at about 750 rpm. The temperature was then increased to 125° C. and the mixing speed was increased to 1,000 rpm. The nitrogen purge was discontinued and full vacuum was applied to remove volatiles for an additional 15 minutes. The nitrogen blanket was again applied and the remainder of Polymer A (35 parts) was added in increments of 5, 10, 20, and 65 weight percent with a 10 minute mixing period between each increment. After the last increment, a full vacuum was applied and the mixing was continued for an additional 30 minutes at 125° C. The resulting foundation mixture (FM) was cooled to room temperature and stored in Semco (R) tubes for formulating into a sealant composition. Sealant compositions were prepared by adding a crosslinking agent to the FM in the Semco tubes and then mixing, where the crosslinking agent, in the amounts shown in Table II, was a mixture which contained 0.5 weight percent dibutyltin dilaurate and 99.5 weight percent of a mixture of 50 weight percent methyltriacetoxysilane and 50 weight percent ethyltriacetoxysilane.

TABLE I

| FM | Diol | Amount diol, parts | Weight ratio diol to filler |
|---|---|---|---|
| 1 | Diol-1 | 1 | 0.074 |
| 2 | Diol-1 | 4 | 0.296 |
| 3 | Diol-2 | 2.44 | 0.195 |
| 4 | Diol-2 | 1.22 | 0.090 |
| 5 | Diol-2 | 1.83 | 0.135 |

TABLE II

SEALANT COMPOSITIONS PREPARED USING FOUNDATION MIXTURE

| INGREDIENTS | FM-1 | FM-2 | FM-3 | FM-4 | FM-5 |
|---|---|---|---|---|---|
| Polymer A | 100 | 100 | 100 | 100 | 100 |
| Silica filler | 13.1 | 13.6 | 13.3 | 13.5 | 13.5 |
| Diol-1 | 1 | 4 | 0 | 0 | 0 |
| Diol-2 | 0 | 0 | 2.44 | 1.22 | 1.83 |
| Crosslinking Agent | 6.3 | 7.25 | 7.4 | 6.03 | 6.06 |

The slump values in centimeters of each sealant composition were determined after various storage periods using ASTM D 2202 procedure, and were as shown in Table III.

TABLE III

| SLUMP FOR SEALANT COMPOSITION MADE USING, in cm | | | | | |
|---|---|---|---|---|---|
| FM DAYS AGED | FM-1 | FM-2 | FM-3 | FM-4 | FM-5 |
| 0 | 0.254 | 0 | 0 | — | — |
| 8 | 0.51 | 0.127 | 0 | — | — |
| 14 | 0.254 | 0.254 | 0.127 | — | — |
| 21 | 1.0 | 0.254 | 0 | — | — |
| 35 | 2.3 | 0.51 | 0.025 | — | — |
| 390 | — | — | — | 0.56 | — |
| 392 | — | — | — | — | 0.254 |

The sealant compositions made using FM-4 and FM-5 were evaluated by measuring both the curing properties and the cured properties. The skin-over-time (SOT) in minutes was determined by spreading out a sample of the sealant composition, about 0.20 to 0.23 cm thick, the surface of the sample was touched lightly with a finger to determine if a skin had formed on the sample's surface. The SOT was the time period in minutes from the samples initial layout until the finger could be touched lightly to the surface of the sample without sealant composition adhering to the finger. The tack-free-time (TFT) in minutes was determined by ASTM C 679 procedure and results were recorded in minutes. The extrusion rates of each sealant composition made using the indicated FM of Table III were determined by using ASTM C 603 procedure and were as shown in Table IV. The ASTM C 603 procedure was followed except the sealant composition was extruded through a nozzle with a 0.3175 cm orifice at a pressure of 620.5 kPa. After curing for 7 days, the durometer on the Shore A scale according to ASTM C-661, and using the procedure of ASTM D-412, the tensile at break, the elongation at break, and the 100 % modulus were determine and were as shown in Table IV.

TABLE IV

| SEALANT COMPOSITION MADE USING FOUNDATION MIXTURE | | |
|---|---|---|
| PROPERTY | FM-4 | FM-5 |
| SOT, minutes | 10 | 9 |
| TFT, minutes | 18 | 20–30 |
| Extrusion Rate, g/min | 354 | 451 |
| Durometer, Shore A | 30 | 25 |
| Tensile Strength, kPa | 2000 | 1820 |
| Elongation, % | 319 | 339 |
| 100% Modulus, kPa | 690 | 600 |

EXAMPLE 2

Foundation mixtures were prepared as described in Example 1, except that increments of 4.4 parts of LM150D, a fumed silica filler having a BET surface area of 150 m$^2$/g from Cabot Corporation was used in place of the TS-610 silica filler and for FM-6 3.5 parts of Diol-2 was used and for FM-7 5.25 parts of Diol-2 was used. Sealant compositions were prepared from each of FM-6 and FM-7 as described in Example 1. For each foundation mixture, the Plateau Stress after defined periods of storage was determined and was as shown in Tables V and VI in dynes/cm$^2$. The Plateau Stress was measured on a Carri-Med Rheometer (Model CSL 500) as described herein.

TABLE V

| Days Aged | Plateau Stress in dynes/cm$^2$ | FM-6 Slump, cm | Sealant Composition Slump, cm |
|---|---|---|---|
| 2 | 809 | 0.381 | 0.381 |
| 7 | 809 | 0.127 | 0.381 |
| 62 | 676 | 0.889 | 0.889 |
| 365 | 452 | 3.556 | >7.62 |

TABLE VI

| Days Aged | Plateau Stress in dynes/cm$^2$ | FM-7 Slump, cm | Sealant Composition Slump, cm |
|---|---|---|---|
| 2 | 1450 | 0.051 | 0 |
| 7 | 1450 | 0.051 | 0 |
| 62 | 1387 | 0.076 | 0.381 |
| 365 | 1268 | 0.254 | 0.279 |

COMPARISON EXAMPLE

Comparison foundation mixtures (C-FM) were prepared by conventional methods and using materials which were available in the prior art. These C-FMs were prepared by admixing 100 parts of Polymer A, an amount of a commercially available treated silica filler as shown in Table VII, and, in some C-FM, a hydroxyl endblocked polydimethylsiloxane fluid (PDMS Fluid) having an average of about 11 dimethylsiloxane units per molecule and about 4 weight percent hydroxyl group. These C-FMs were mixed using a twin screw extruder which was cooled to maintain the temperature at about ambient. Each of the C-FM after defined periods of aging were further mixed with an amount of crosslinker mixture of acetoxysilanes and tin catalyst as described in Example 1. The slump values of the catalyzed silicone composition was determined, as well as, the SOT and TFT. The results observed were as shown in Table VIII, Table IX, Table X, and Table XI.

TABLE VII

| Comparison FM | Silica Type | Silica Amount, parts | PDMS Fluid parts |
|---|---|---|---|
| 1 | M-7 (4) | 11.5 | 0 |
| 2 | TS-610 | 11.5 | 0 |
| 3 | TS-610 | 13.5 | 0 |
| 4 | TS-610 | 15.5 | 0 |
| 5 | TS-610 | 15.5 | 4 |
| 6 | TS-610 | 13.5 | 4 |
| 7 | TS-530 | 13.5 | 4 |

(4) M-7 was an untreated fumed silica from Cabot Corporation with a BET surface area of about 200 m$^2$/g.

TABLE VIII

| | Slump (in cm) of Sealant Made with acetoxysilane crosslinker and from Comparison FM stored for | | | | |
|---|---|---|---|---|---|
| C-FM used | 0 days | 7 days | 21 days | 56 days | 98 days |
| 1 | 0 | — | — | — | — |
| 2 | — | 0.51 | 10.2 | >10.2 | >10.2 |
| 3 | 0.51 | 2.03 | 7.6 | >10.2 | >10.2 |
| 4 | 0.76 | 2.03 | — | 2.54 | 8.13 |
| 5 | 0.127 | 1.02 | 1.02 | 2.54 | 5.84 |

TABLE VIII-continued

Slump (in cm) of Sealant Made with acetoxysilane crosslinker and from Comparison FM stored for

| C-FM used | 0 days | 7 days | 21 days | 56 days | 98 days |
|---|---|---|---|---|---|
| 6 | 0.254 | 0.76 | >7.6 | >7.6 | >10.2 |
| 7 | 0.76 | 0.76 | 2.03 | 2.03 | 1.78 |

TABLE IX

SOT (in min) of Sealant Made with acetoxysilane crosslinker and from C-FM stored for

| C-FM used | 0 days | 7 days | 21 days | 56 days | 98 days |
|---|---|---|---|---|---|
| 1 | 6 | — | — | — | — |
| 2 | — | 7 | 8 | — | — |
| 3 | 16 | 7 | 8 | 11 | 10 |
| 4 | 16 | 12 | 9 | 10 | 11 |
| 5 | 16 | 9 | 7 | 10 | 11 |
| 6 | 16 | 8 | 8 | 11 | 11 |
| 7 | 16 | 8 | 7 | 10 | 11 |

TABLE X

TFT (in min) of Sealant Made with acetoxysilane crosslinker and from C-FM stored for

| C-FM used | 0 days | 7 days | 21 days | 56 days | 98 days |
|---|---|---|---|---|---|
| 1 | 16 | — | — | — | — |
| 2 | — | 30 | >22 | — | — |
| 3 | 25 | 30 | 18 | 18 | 20 |
| 4 | 25 | 26 | 19 | 19 | 21 |
| 5 | 25 | 23 | 16 | 19 | 19 |
| 6 | 25 | 21 | 19 | 19 | 18 |
| 7 | 25 | 20 | 19 | 19 | 19 |

TABLE XI

Extrusion Rate (in gm/minute) of Sealand Made with acetoxysilane crosslinker and from C-FM stored for

| C-FM used | 0 days | 7 days | 21 days | 56 days | 98 days |
|---|---|---|---|---|---|
| 1 | 335 | — | — | — | — |
| 2 | — | 329 | 328 | — | — |
| 3 | 451 | 234 | 213 | 200 | 180 |
| 4 | 415 | 182 | 185 | 150 | 120 |
| 5 | 552 | 451 | 416 | 390 | 374 |
| 6 | 656 | 492 | 429 | 402 | 368 |
| 7 | 780 | 387 | 416 | 400 | 376 |

From Tables VIII, IX, X, and XI these results show that the conventional method of preparing RTV silicone compositions did not provide a low slump product although the SOT and TFT were acceptable. The C-FM's 2, 3, and 4 were made using treated silica fillers and C-FM's were made from treated silica fillers plus an additional amount of a treating agent as suggested by the prior art and even these treated silica fillers with additional treating agent did not provide an RTV silicone sealant composition with low slump properties beyond a one week storage of the comparison foundation mixture. The extrusion rates dropped off rapidly for those comparison foundation mixtures which did not contain the additional treating agent.

That which is claimed is:

1. A process for making a pumpable, stable, polydiorganosiloxane-silica foundation mixture comprising
   (i) mixing a polydiorganosiloxane having a viscosity measured at 25° C. of from 0.1 to 400 Pa.s, a diol surface modifying agent of the formula R'O(R$_2$SiO)$_x$R' wherein R is methyl, ethyl, vinyl, or 3,3,3-trifluoropropyl; each R' is selected from the group consisting of hydrogen atom, methyl radical, and ethyl radical; up to 30 percent of R' groups are methyl radical or ethyl radical, and x is a value of from 2 to 18 inclusive and the diol surface modifying agent has at least 3 weight percent silicon-bonded hydroxyl group, and reinforcing silica filler having a surface area of 90 to 500 m$^2$/g and making a Mixture 1 where the amount of the polydiorganosiloxane is from 50 to 100 weight percent of the amount necessary to provide from 80 to 95 weight percent in the foundation mixture, diol in an amount to provide from 20 to 100 weight percent of the amount necessary to provide from 0.05 to 0.5 part of diol per one part of silica filler in the foundation mixture, and silica filler in an amount to provide from 0 to 100 weight percent of the amount necessary to provide from 5 to 19.5 weight percent of silica filler in the foundation mixture based on the weight of the polydiorganosiloxane, the silica filler, and the diol being 100 weight percent, where the silica filler is dispersed throughout the polydiorganosiloxane
   (ii) mixing with Mixture 1, one or more increments, where an increment is at least 5 weight percent of the amount to be added, of diol and silica filler to make Mixture 2, where the amount of the diol is from 0 to 80 weight percent of the amount necessary to provide from 0.05 to 0.5 part of diol per one part of silica filler in the foundation mixture and the amount of the silica filler is up to 100 weight percent of the amount necessary to provide from 5 to 19.5 weight percent silica filler in the foundation mixture based on the weight of the polydiorganosiloxane, the silica filler, and the diol being 100 weight percent,
   (iii) mixing with Mixture 2, one or more increments, where an increment is at least 5 weight percent of the amount to be added, of polydiorganosiloxane as defined in (i) to make Mixture 3 and in an amount of 0 to 50 weight percent of the amount necessary to provide from 80 to 95 weight percent of the polydiorganosiloxane in the foundation mixture,
   (iv) mixing and heating Mixture 3 for at least 15 minutes at a temperature of from 50° C. to 180° C. while removing volatiles from Mixture 3, and obtaining a foundation mixture having from 5 to 19.5 weight percent silica filler and from 80 to 95 weight percent polydiorganosiloxane based on the weight of the polydiorganosiloxane, the silica filler, and the diol being 100 weight percent, where the foundation mixture has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

2. The process according to claim 1 in which the silica filler content of the foundation mixture of step (iv) is from 5 to 15 weight percent based on the total weight of the foundation mixture.

3. The process according to claim 2 in which the diol surface modifying agent is a mixture of molecules in which at least 50 percent of the molecules have x values of no more than 6 and the silicon-bonded hydroxyl content of the mixture is at least 6 weight percent.

4. A foundation mixture obtained from the process of claim 2 which has a plateau stress of >700 dynes/cm$^2$ and a shear-thinned viscosity of no more than 1,000 Pa.s at a shear stress of 50,000 dynes/cm$^2$ and the plateau stress and shear-thinned viscosity are measured at 25° C.

5. A foundation mixture obtained from the process of claim 2 which has a plateau stress of >1000 dynes/cm$^2$ and a shear-thinned viscosity of no more than 600 Pa.s at a shear stress of 50,000 dynes/cm$^2$ and the plateau stress and shear-thinned viscosity are measured at 25° C.

6. A foundation mixture obtained from the process of claim 3 which has a plateau stress of >700 dynes/cm$^2$ and a shear-thinned viscosity of no more than 1,000 Pa.s at a shear stress of 50,000 dynes/cm$^2$ and the plateau stress and shear-thinned viscosity are measured at 25° C.

7. A foundation mixture obtained from the process of claim 3 which has a plateau stress of >1000 dynes/cm$^2$ and a shear-thinned viscosity of no more than 600 Pa.s at a shear stress of 50,000 dynes/cm$^2$ and the plateau stress and shear-thinned viscosity are measured at 25° C.

8. The foundation mixture according to claim 4 in which the polydiorganosiloxane has at least 80 percent of the ends terminated with silicon-bonded hydroxyl groups.

9. The foundation mixture according to claim 5 in which the polydiorganosiloxane has at least 80 percent of the ends terminated with silicon-bonded hydroxyl groups.

10. The foundation mixture according to claim 6 in which the polydiorganosiloxane has at least 80 percent of the ends terminated with silicon-bonded hydroxyl groups.

11. The foundation mixture according to claim 7 in which the polydiorganosiloxane has at least 80 percent of the ends terminated with silicon-bonded hydroxyl groups.

12. A room temperature vulcanizable silicone sealant composition comprising the foundation mixture according to claim 4 and further comprising a moisture hydrolyzable crosslinking silicone compound.

13. A room temperature vulcanizable silicone sealant composition comprising the foundation mixture according to claim 5 and further comprising a moisture hydrolyzable crosslinking silicone compound.

14. A room temperature vulcanizable silicone sealant composition comprising the foundation mixture according to claim 6 and further comprising a moisture hydrolyzable crosslinking silicone compound.

15. A room temperature vulcanizable silicone sealant composition comprising the foundation mixture according to claim 7 and further comprising a moisture hydrolyzable crosslinking silicone compound.

16. A room temperature vulcanizable silicone sealant composition comprising the foundation mixture according to claim 8 and further comprising a moisture hydrolyzable crosslinking silicone compound.

17. A room temperature vulcanizable silicone sealant composition comprising the foundation mixture according to claim 9 and further comprising a moisture hydrolyzable crosslinking silicone compound.

18. A room temperature vulcanizable silicone sealant composition comprising the foundation mixture according to claim 10 and further comprising a moisture hydrolyzable crosslinking silicone compound.

19. A room temperature vulcanizable silicone sealant composition comprising the foundation mixture according to claim 11 and further comprising a moisture hydrolyzable crosslinking silicone compound.

20. The method in accordance with claim 2 in which the diol surface modifying agent is present in an amount such that there is 0.015 to 0.025 part by weight of the silicon-bonded hydroxyl group per one part by weight of silica filler.

21. The method in accordance with claim 3 in which the diol surface modifying agent is present in an amount such that there is 0.015 to 0.025 part by weight of the silicon-bonded hydroxyl group per one part by weight of silica filler.

\* \* \* \* \*